United States Patent
Das et al.

(10) Patent No.: US 7,054,435 B2
(45) Date of Patent: *May 30, 2006

(54) APPARATUS AND METHOD FOR DETERMINING A MINIMAL TIME BOUND FOR PERFORMING TONE DETECTION

(75) Inventors: Sharmistha Sarkar Das, Broomfield, CO (US); Manish Marwah, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 655 days.

This patent is subject to a terminal disclaimer.

(21) Appl. No.: 10/117,371

(22) Filed: Apr. 5, 2002

(65) Prior Publication Data

US 2003/0190038 A1    Oct. 9, 2003

(51) Int. Cl.
*H04M 3/00* (2006.01)
(52) U.S. Cl. ..................... 379/386; 379/377
(58) Field of Classification Search ............. 379/386, 379/387.01, 377, 418, 100.06, 100.14, 372

See application file for complete search history.

(56) References Cited

U.S. PATENT DOCUMENTS

| | | | |
|---|---|---|---|
| 5,416,836 A | 5/1995 | Marinelli | |
| 5,483,593 A * | 1/1996 | Gupta et al. | 379/386 |
| 5,521,967 A | 5/1996 | Novas | |
| 5,581,602 A | 12/1996 | Szlam | |
| 5,719,932 A | 2/1998 | Royabal | |
| 5,867,568 A | 2/1999 | Ackerman | |
| 6,041,116 A | 3/2000 | Meyers | |
| 6,173,261 B1 | 1/2001 | Arai et al. | |
| 6,233,319 B1 | 5/2001 | Cox et al. | |
| 6,748,059 B1 * | 6/2004 | Das et al. | 379/100.14 |

* cited by examiner

*Primary Examiner*—Sinh Tran
*Assistant Examiner*—Walter F Briney, III
(74) *Attorney, Agent, or Firm*—John C. Moran

(57) ABSTRACT

Performing tone detection for an amount of time that is calculated from the tones that the detector is designed to detect.

26 Claims, 9 Drawing Sheets

|    | T1 | T2 | T3 | T4 | T5 | T6 |
|----|----|----|----|----|----|----|
| T1 | X  |    |    |    |    |    |
| T2 | X  | X  |    |    |    |    |
| T3 | X  | X  | X  |    |    |    |
| T4 | X  | X  | X  | X  |    |    |
| T5 | X  | X  | X  | X  | X  |    |
| T6 | X  | X  | X  | X  | X  | X  |

TABLE 1

APPARATUS AND METHOD FOR DETERMINING A MINIMAL TIME BOUND FOR PERFORMING TONE DETECTION

TECHNICAL FIELD

This invention relates to telecommunication systems in general, and in particular, to the capability of doing call classification in a time efficient manner.

BACKGROUND OF THE INVENTION

Call classification is the ability of a telecommunication system to determine how a telephone call has been terminated at a called end point. An example of a termination signal that is received back for call classification purposes is a busy signal that is transmitted to the calling party upon the called party being engaged in a telephone call. Another example is a intercept tone that is transmitted to the calling party by the telecommunication switching system if the calling party has made a mistake in dialing the called party. Another example of a tone that has been used within the telecommunication network to indicate that a voice message will be played to the calling party is a special information tone (SIT) that is transmitted to the calling party before a recorded voice message is sent to the calling party.

Call classification is used in conjunction with different types of services. For example, outbound-call-management, coverage of calls redirected off the net (CCRON), and call detail recording are services that require accurate call classification. Outbound-call management is concerned with when to add an agent to a call that has automatically been placed by an automatic call distribution center (also referred to as a telemarketing center) using predictive dialing. Predictive dialing is a method by which the automatic call distribution center automatically places a call to a telephone before an agent is assigned to handle that call. The accurate determination if a person has answered a telephone versus an answering machine or some other mechanism is important because the primary cost in an automatic call distribution center is the cost of the agents. Call detail recording is concerned with the accurate determination of whether a call has been completed to a person. This is important in many industries. An example of such an industry is the hotel/motel particularly where the hotel/motel applications are utilizing analog trunks to the switching network that do not provide answer supervision. It is necessary to accurately determine whether or not the call was completed to a person or a network message so as to accurately bill the user of the service within the hotel. Call detailed recording is also concerned with the determination of different statuses of call termination such as hold status (e.g. music on hold), fax and/or modem tone. An example of CCRON is its utilization by an in-call coverage feature on an enterprise switching system where the feature transfers an incoming call destined for a user's desk telephone to the user's cellular telephone.

As can be seen from the previous discussion, the accurate and rapid detection of tones is important to outbound-call-management, CCRON, and call detailed recording services. The speed of tone detection is determined by the amount of the tone that must be analyzed before classification is complete. The problem is made more difficult by the fact that a tone detector can not assume that its operation starts at the beginning of the tone. Also, the tone may not be precisely what it is specified to be. Further, the tone may be corrupted by noise.

SUMMARY OF THE INVENTION

This invention is directed to solving these and other problems and disadvantages of the prior art. According to an embodiment of the invention, the amount of time for which tone detection is performed is calculated from the tones that the detector is designed to detect.

DETAILED DESCRIPTION

Figure 1:
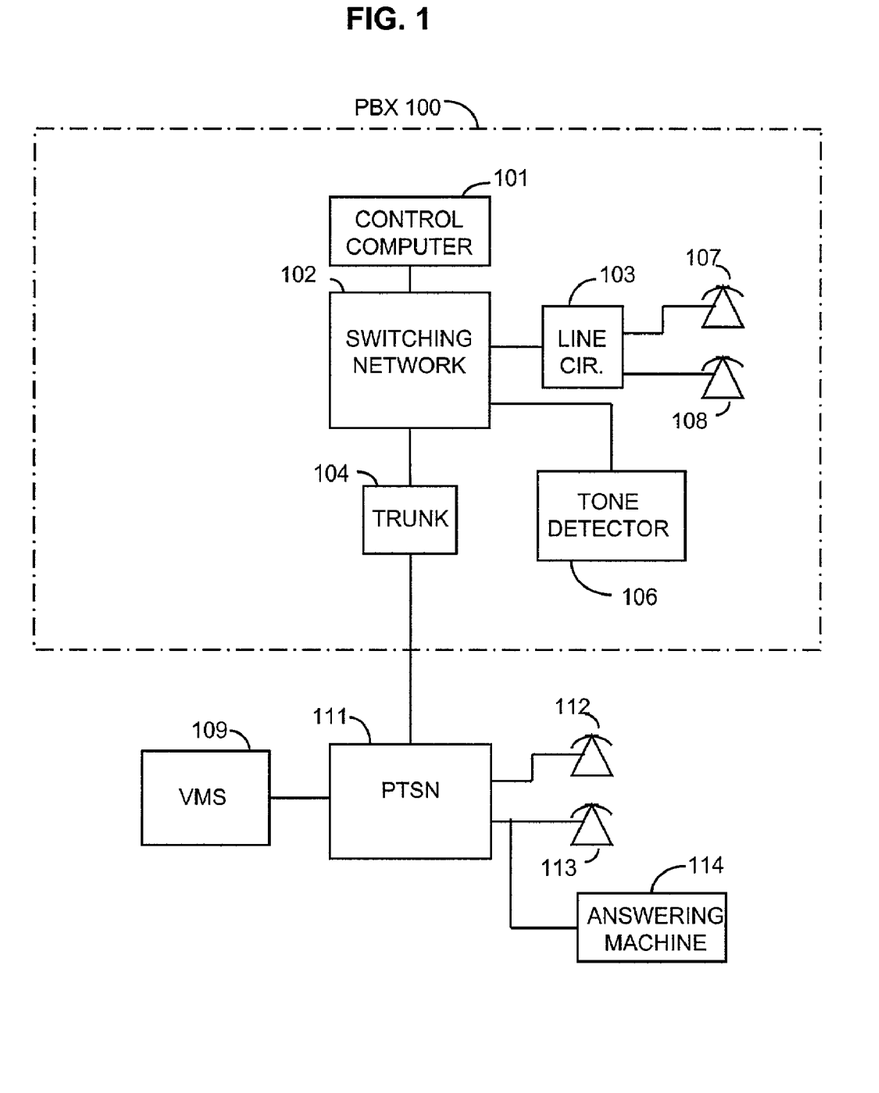
FIG. 1 illustrates an embodiment for utilizing the invention.

FIG. 1 illustrates a tone detector that utilizes an embodiment, in accordance with the invention, to determine a maximum time interval over which tone detection is performed. In FIG. 1, control computer 101 utilizes tone detector 106 to perform call classification for such types of service as outbound-call-management, coverage of calls redirected off the net, and call detailed recording. One skilled in the art would readily realize that control computer 101 could utilize tone detector 106 for other types of call classification operations. Further, one skilled in the art would readily realize that embodiments of tone detector 106 could also be utilized within voice message system (VMS) 109 and public telephone switching network (PTSN) 111. In addition, one skilled in the art would realize that tone detector 106 could also be utilized in various types of digital telephony systems.

Consider the following example of the utilization by control computer 101 of tone detector 106. Assume that telephone set 108 places a call to telephone 113 via line circuit 103, switching network 102, trunk 104, and PTSN 111. When the call is initially placed by telephone set 108, control computer 101 bridges tone detector 106 on to this call via switching network 102. Control computer 101 also initiates the operation of tone detector 106 on this call. The call may be terminated on telephone set 113, answering machine 114 or VMS 109. Tone detector 106 transmits a message to control computer 101 informing control computer 101 of the entity on which the call was terminated. In addition, if the user of telephone set 108 misdialed, PTSN may transmit a intercept tone.

Figure 2:
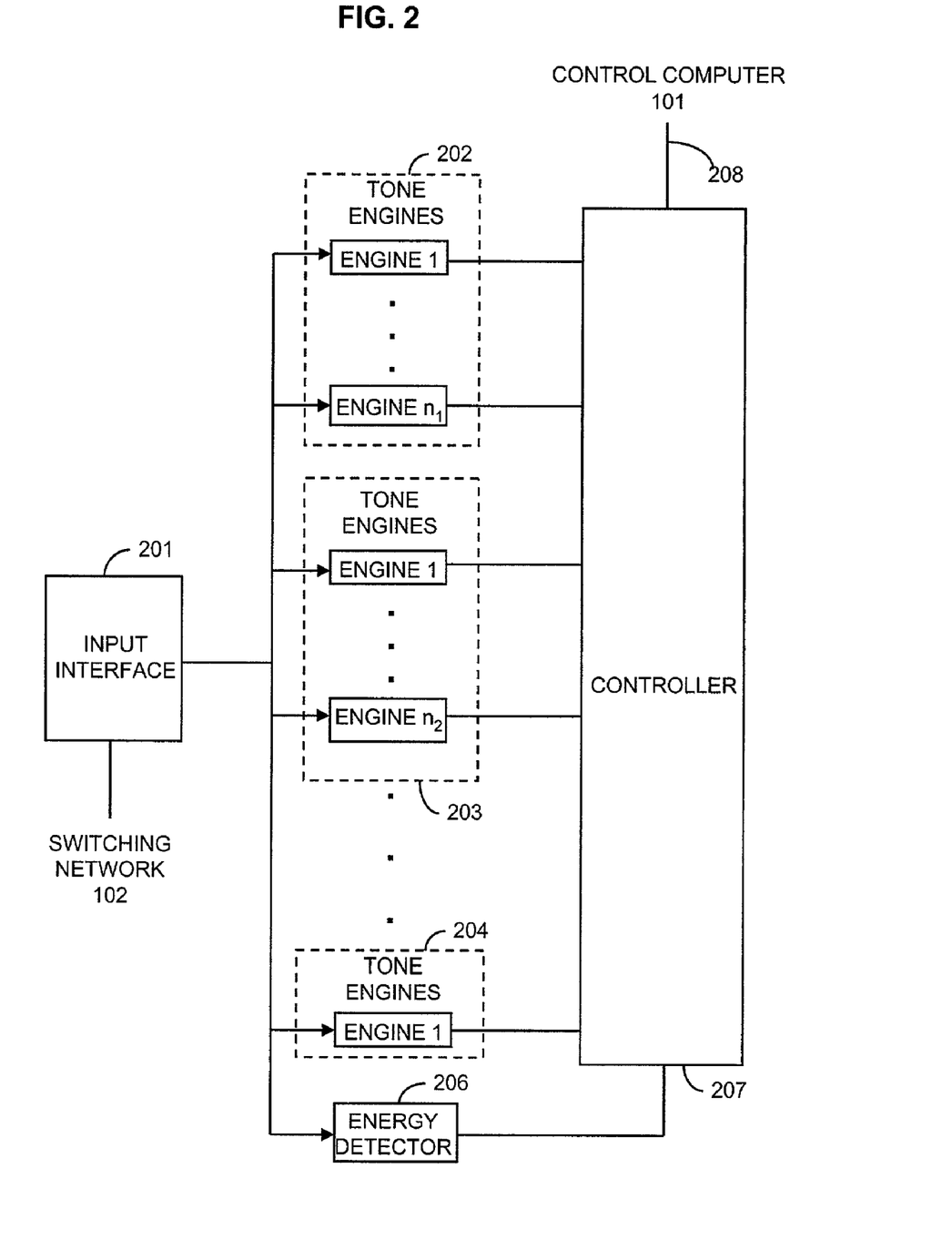
FIG. 2 illustrates, in block diagram form, a tone detector.

A tone detector is illustrated in FIG. 2. For each tone that detector 106 is to detect, there is set of tone engines. These are designated in FIG. 2 as tone engines 202 through tone engines 204. As will be explained below by way of an example, there is one engine for each period of the tone that is being detected. Where a period is defined as a non-repeating and complete time interval of energy or silence. Each interval of energy or silence is considered as a separate energy state. Hence, a tone such as the tone illustrated on line 302 of FIG. 3 has two periods. Within a tone engines block, there can be from one tone engine to n tone engines to perform the operations of detecting for a tone. For a given tone, "n" is equal to the number of periods in the tone. A tone engine block that consists of only one tone engine would be one that would detect tones that are non-repetitive in operation. An example of such a tone is a SIT tone that has different frequencies within one energy state.

When controller 207 receives a message from control computer 101 via link 208 to start detecting for a tone, it utilizes energy detector 206 to determine a transition between low and high energy of the information being received from switching network 102 via input interface 201. When such a transition is detected, controller 207 initiates the operations of all engines in tone engines 202–204. Within each of the tone engines blocks, each engine is attempting to match the incoming signal being received from input interface 201 to the cadence and frequency of a particular part of a tone. When energy detector 206 determines that another transition has occurred, controller 207 polls each engine to determine if a valid match has been determined. Any engine that has not found a valid match is disabled. The remaining engines then attempt to find a match for the next period. Not only are the engines illustrated in tone engines 202–204 matching for sequences of periods to determine cadence but they may also be detecting for frequencies within the periods containing energy. In addition to performing matching, the engines may also as described with respect to FIG. 8 be computing a value that defines the goodness of the fit of the match to each period. Tone engines 202–204 may be implemented as hardware devices by using wired logic or programmable logic arrays or by programming one or more programmable processors to perform the functions of the tone engines. Further, the programmable processors may general purpose processors, digital signal processors (DSP) or other well known processors. These programmable processors may be programmed in a number of well known software programming languages.

Figure 3:
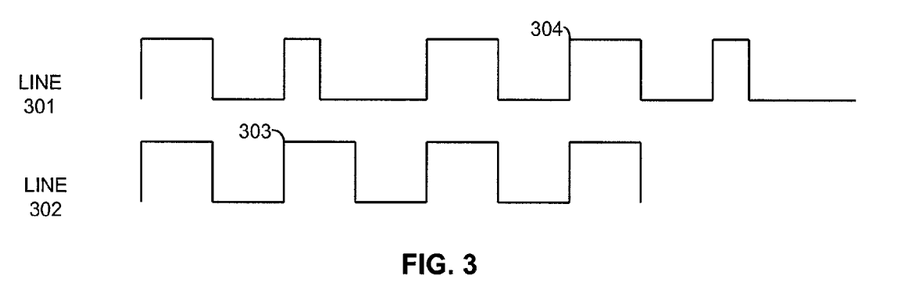
FIG. 3 illustrates an example of two tones.
Figure 4:
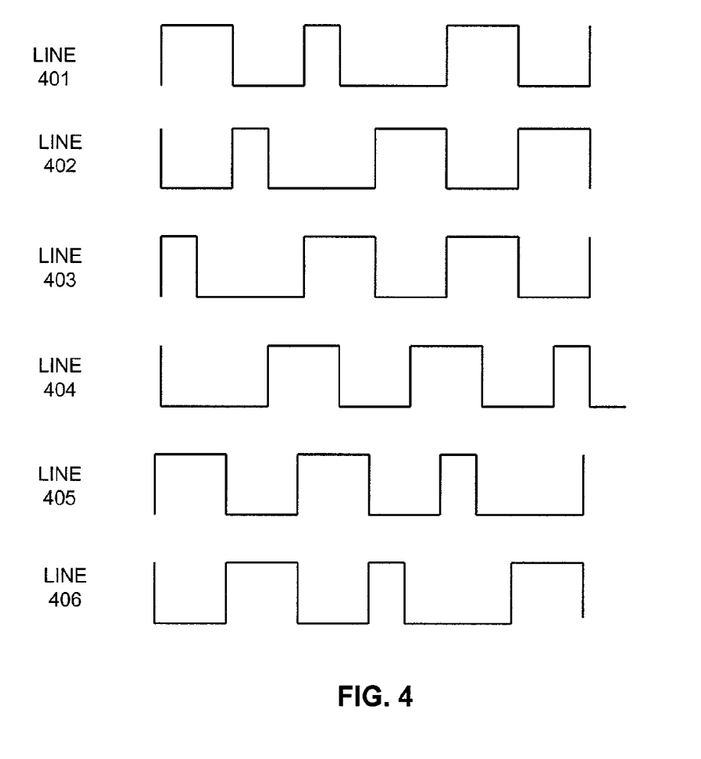
FIGS. 4 and 5 illustrate the pattern detection of engines for the tones of FIG. 3.
Figure 5:
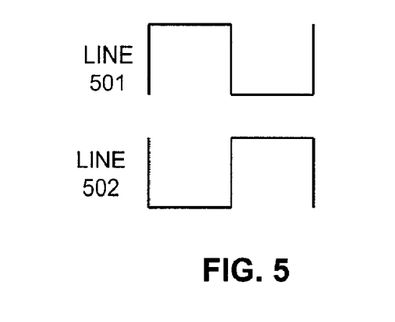

By way of an example, consider FIGS. 3–5, these figures are used to illustrate an example of tone detector 106 of FIG. 1 that could detect two different tones as illustrated in FIG. 3. Line 301 of FIG. 3 illustrates the cadence of one tone, and line 302 indicates the cadence of another tone. The energy periods could also be distinguished by having different frequencies although this example does not describe such energy periods. The sequences of periods illustrated in FIG. 4 define the operations of engines in an embodiment of tone detector 106 that detects the tone of line 301. Each line of FIG. 4 illustrates a sequence of periods that one engine will attempt to match for an unknown tone to determine if the unknown tone is the tone illustrated in line 301 of FIG. 3. In order to detect the tone of line 301, it is necessary to have six engines in a tone engine block of tone engines 202 of FIG. 2 for the tone of line 301. The reason is that there are six periods from the start of line 301 to the end of the non-repeating portion of line 301. The start of repeating portion is designated by 304 in FIG. 3.

By the same token, the tone engines block for a tone as illustrated in line 302 requires only two engines as is illustrated in FIG. 5. The reason is that there are only two periods in line 302 before it repeats as is illustrated by point 303 of FIG. 3.

Figure 6:
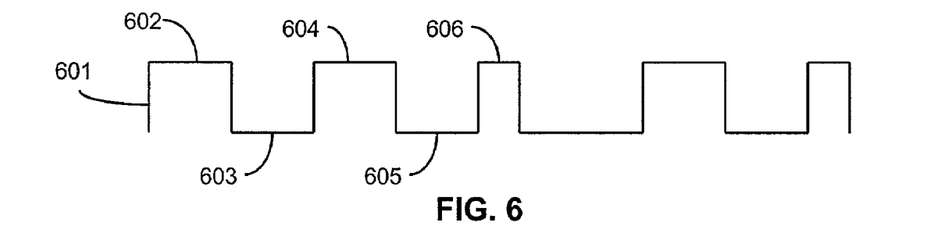
FIG. 6 illustrates an example of a tone to be detected.

To illustrate the operation of such a tone detector based on the engines illustrated in FIGS. 4 and 5, consider the input signal illustrated in FIG. 6. When controller 207 detects via energy detector 206 the transition point 601 of FIG. 6, controller 207 initiates all of the engines. During the first period of high energy as denoted by 602, the engines illustrated by lines 401 and 405 of FIG. 4 as well as line 501 of FIG. 5 determine matches. In response, controller 207 disables the remaining engines. During the low energy period 603, the engines illustrated by lines 401, 405, and 501 also determine matches. During high energy period 604, the engine associated with line 401 will not determine a match; however, the engines illustrated by lines 405 and 501 do. In response, controller 207 disables the engine associated with line 401. During the low energy period 605, the engines illustrated by lines 405 and 501 determine matches, and controller 207 allows these two engines to remain active. However, during the high energy period 606, only the engine associated with line 405 determines a match. In response to only one engine determining a match, controller 207 transmits to control computer 101 a message indicating that the tone has been determined to be that of line 301 of FIG. 3.

However, if high energy period 606 was extend by noise, the engine associated with line 501 also would determine a match but with a low value for the goodness of fit. Hence, both the engine associated with line 405 and the engine associated with line 501 would continue to indicate matches.

Figure 12:
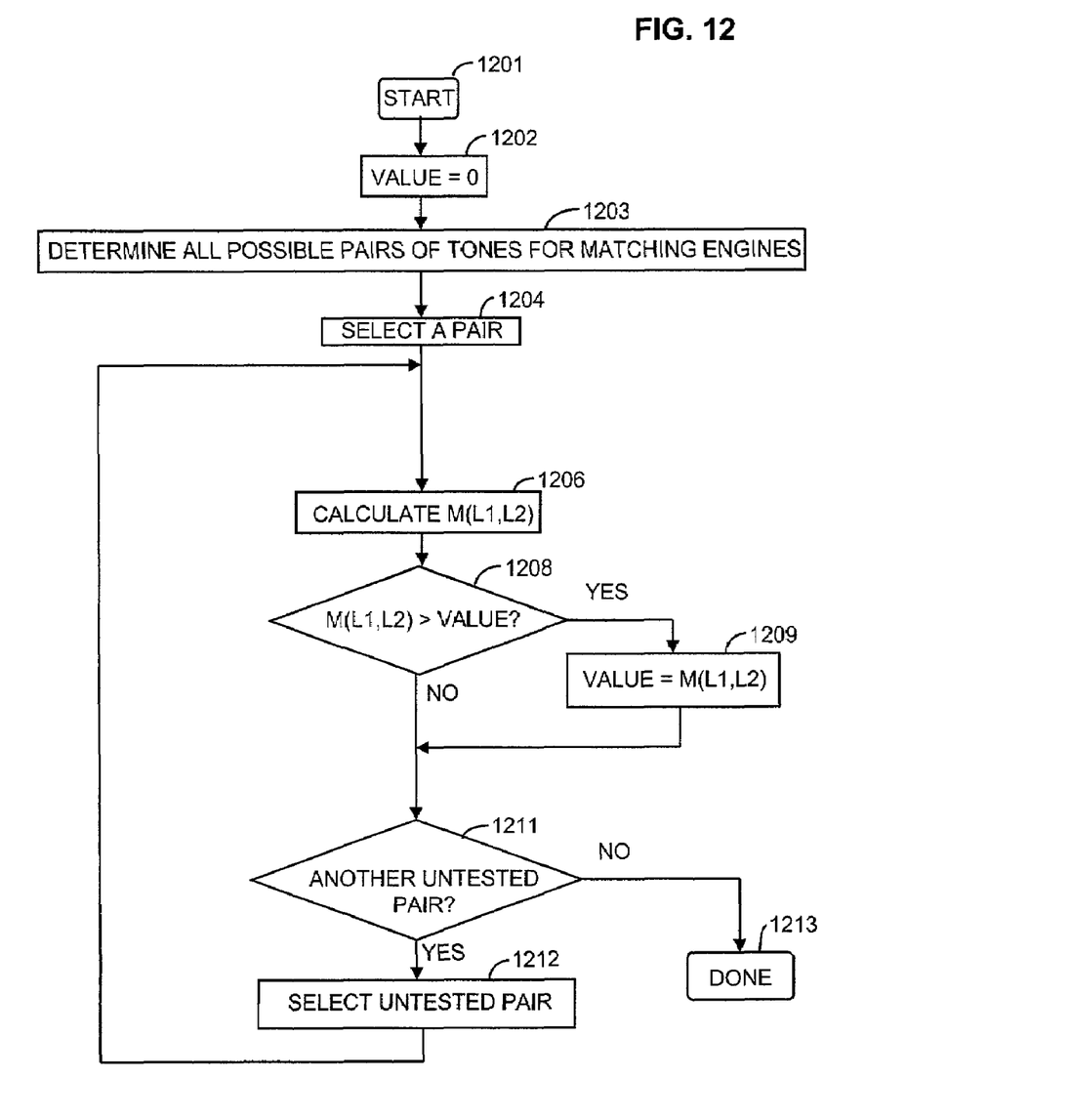
FIG. 12 illustrates, in flow chart form, operations performed by an embodiment of the invention.

As can be seen from the following example, it is important to know when to stop the operation of the tone detector and to use the goodness of fit value to determine tone. Further where the tone detector is capable of detecting a number of tones, the number of periods of the unknown tone that must be examined by the tone detector is not intuitively obvious. The number of periods of the unknown tone that must be analyzed by the tone detector is determined by performing the operations of embodiments illustrated in FIG. 7, 10, or 12. At the completion of the operations of FIG. 7, the variable "VALUE" will contain the maximum number of periods (maximum time interval) that must be analyzed by tone detector 106 to determine an unknown tone. Controller 207 may perform the operations illustrated in FIG. 7 or 10 each time that a tone is to be detected, controller 207 may perform the operations each time controller 207 restarted, or the operations of FIG. 7 or 10 may be performed during manufacturing of tone detector 106 and be stored in non-volatile memory of controller 207. As is described in greater detail with respect to FIG. 9, the operations of FIG. 12 are performed during the detection of the unknown tone.

Figure 7:
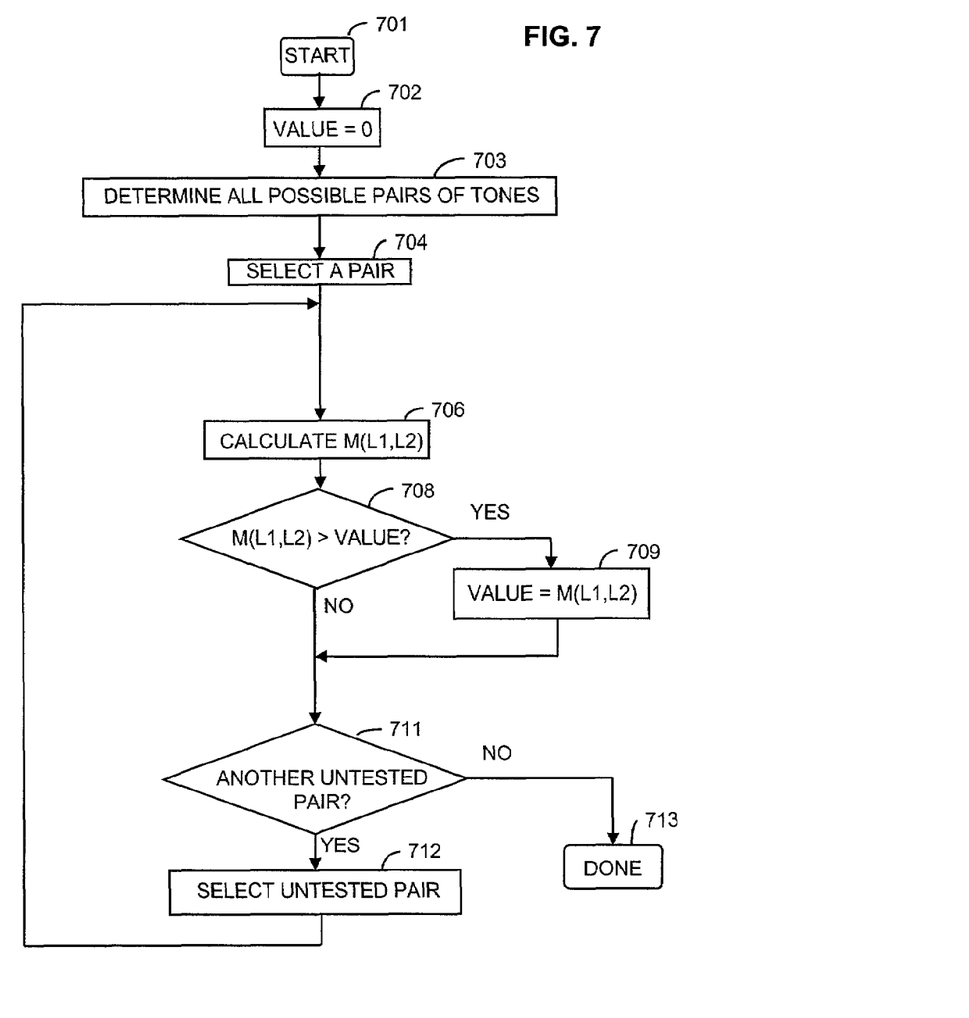
FIG. 7 illustrates, in flow chart form, operations performed by an embodiment of the invention.

Once started in block 701, block 702 sets VALUE equal to zero. Block 703 then determines all possible combinations of pairs of tones that tone detector 106 is capable of detecting. Block 704 then selects a pair from the determined pairs of tones. Block 706 then performs the calculation illustrated in the following Equation 1:

$$m(l_1, l_2) = \begin{cases} m(l_2, l_1) & \text{if } l_2 > l_1 \\ l_1 & \text{if}(l_1 \bmod l_2) = 0 \\ l_1 - (l_1 \bmod l_2) + m(l_2, l_1 \bmod l_2) & \text{otherwise} \end{cases}$$

This equation performs the calculation to determine $M(l_1, l_2)$. (Note that L1, $L_1$ and $l_1$ are equivalent as are L2, $L_2$ and $l_2$.)

Decision block 708 then determines if the numerical value of the calculations performed in Equation 1 are greater than the contents of the variable VALUE. If the answer is yes, block 709 sets the variable VALUE equal to the results of the calculation. After execution of block 709 or if the decision in decision block 708 was no, control is transferred to decision block 711. The latter decision block determines if there is an untested pair in the determined pairs of block 703. If the answer is no, the operations are complete, and control is transferred to block 713. If the answer in decision block 711 is yes, block 712 selects another pair from the untested pairs and returns control to block 706.

During a period of high or low energy, it is possible to encounter noise. Controller 207 utilizes energy detector 206 to determine noise which is defined as a predetermined percentage of a given period. Upon determining that noise is present, controller 207 instructs the engines of tone engines 202–204 to ignore the portion of time that the noise is present.

In addition, to the presence of noise in an audio stream in which detector is attempting to detect a tone, the tone itself may not be precisely at its designated period and frequencies. These two factors could cause an engine to determine that it was not matching a tone whereas in reality it was a tone that should have been matched by that particular engine. To overcome this problem of imprecision with respect to frequency and duration of a period, the engines do not transmit to controller 207 a simple match or no match rather, the engines transmit to controller 207 a goodness of fit value which is maintained during the operation of the detector as a sum for each valid engine. Advantageously, the goodness of fit value may be the square of the Euclidean distance between the designated period and that which is received by the engine from input interface 201. If after a sufficient number of periods have been analyzed and there are still two or more engines indicating matches, controller 207 utilizes the engine having the best sum of goodness fit values as indicating the correct tone.

The sufficient number of matches is computed theoretically using the equation for $M(l_1, l_2)$ which is based on the number of periods of all of the tones that have valid engines associated with them.

Figure 8:
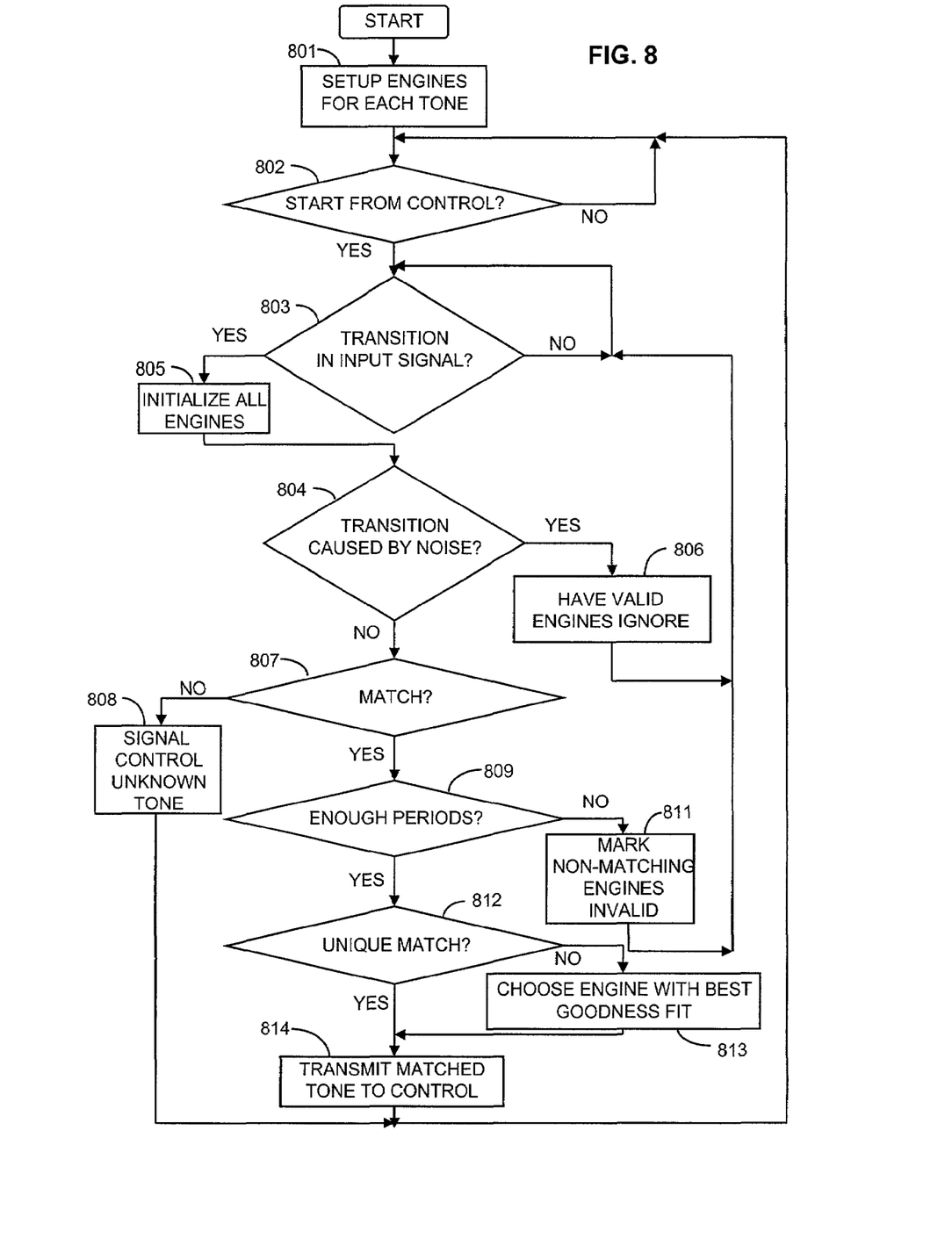
FIG. 8 illustrates, in flow chart form, operations for determining a tone in an embodiment of the invention.

FIG. 8 illustrates, in greater detail, the tone detector illustrated in FIG. 2. After the detector is started, block 801 sets up the engines for each of the tone engines blocks. After this is accomplished, decision block 802 waits for a start signal from the control entity. In the case of FIG. 1, this control entity is control computer 101. If a control signal is not received, decision block 802 is re-executed. If the control signal is received from the control, block 805 initializes all of the engines of FIG. 2 to be prepared to start pattern matching on periods.

Decision block 803 then determines when a transition has occurred in the input signal. After a transition has occurred, decision block 804 determines if this transition was caused by noise. If the answer is yes, block 806 instructs all of the valid engines to ignore the noise and proceed with the matching for the present period. Control is transferred back to decision block 803 from block 806. If the transition was not caused by noise, control is transferred to decision block 807 which determines if any of the engines have determined a match. If the answer is no, control is transferred to block 808 which signals the control that the tone is unknown before transferring control back to decision block 802. If the answer in decision block 807 is yes, decision block 809 determines if enough periods have been analyzed. Decision block 809 makes this determination by comparing the number of periods that have been analyzed with the variable VALUE calculated by an embodiment, in accordance with the invention, as illustrated in FIG. 7. If the answer in decision block 809 is that the number of analyzed periods is less than VALUE (no), block 811 marks the non-matching engines as invalid by informing them to stop the matching process and transfers control back to decision block 803. If the answer in decision block 809 is yes, decision block 812 determines if only one engine is indicating a match. If the answer is no meaning that there are more than one engine indicating a match after sufficient periods have been analyzed, block 813 chooses the engine which has the best goodness fit, and the identification of the associated tone is transmitted to the control by block 814. If the answer in decision block 812 is yes, the unique engine that found a match has its tone designation transmitted to the control by block 814. After transmission of the determined tone designation to the control, block 814 transfers control back to decision block 802. The blocks illustrated in FIG. 8 may be performed in a different order or may be performed in parallel.

Figure 9:
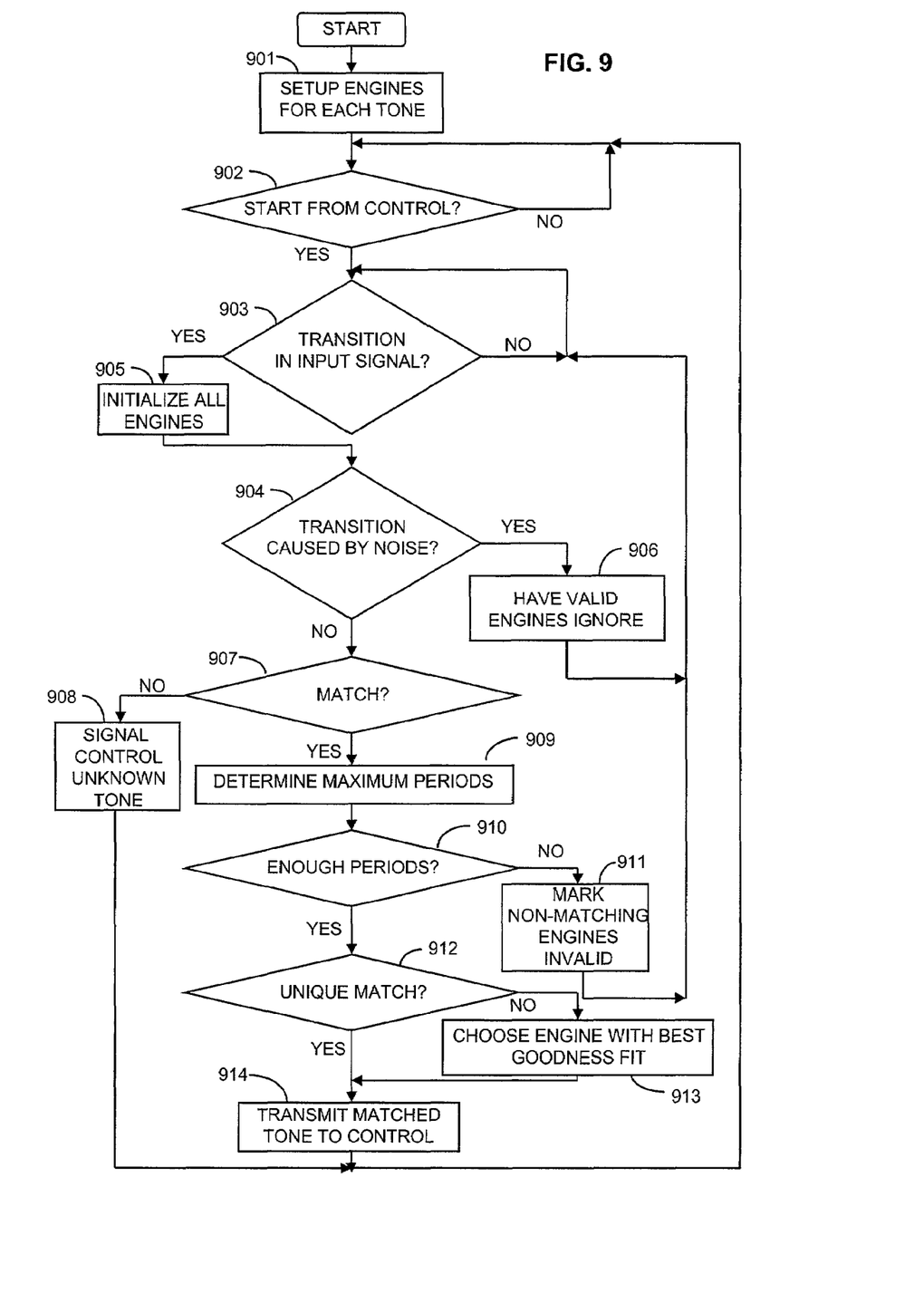
FIG. 9 illustrates, in flow chart form, operations for determining a tone in an embodiment of the invention.

FIG. 9 illustrates, in greater detail, another embodiment of the tone detector illustrated in FIG. 2. After the detector is started, block 901 sets up the engines for each of the tone engines blocks. After this is accomplished, decision block 902 waits for a start signal from the control entity. In the case of FIG. 1, this control entity is control computer 101. If a control signal is not received, decision block 902 is re-executed. If the control signal is received from the control, block 905 initializes all of the engines of FIG. 2 to be prepared to start pattern matching on periods.

Figure 10:
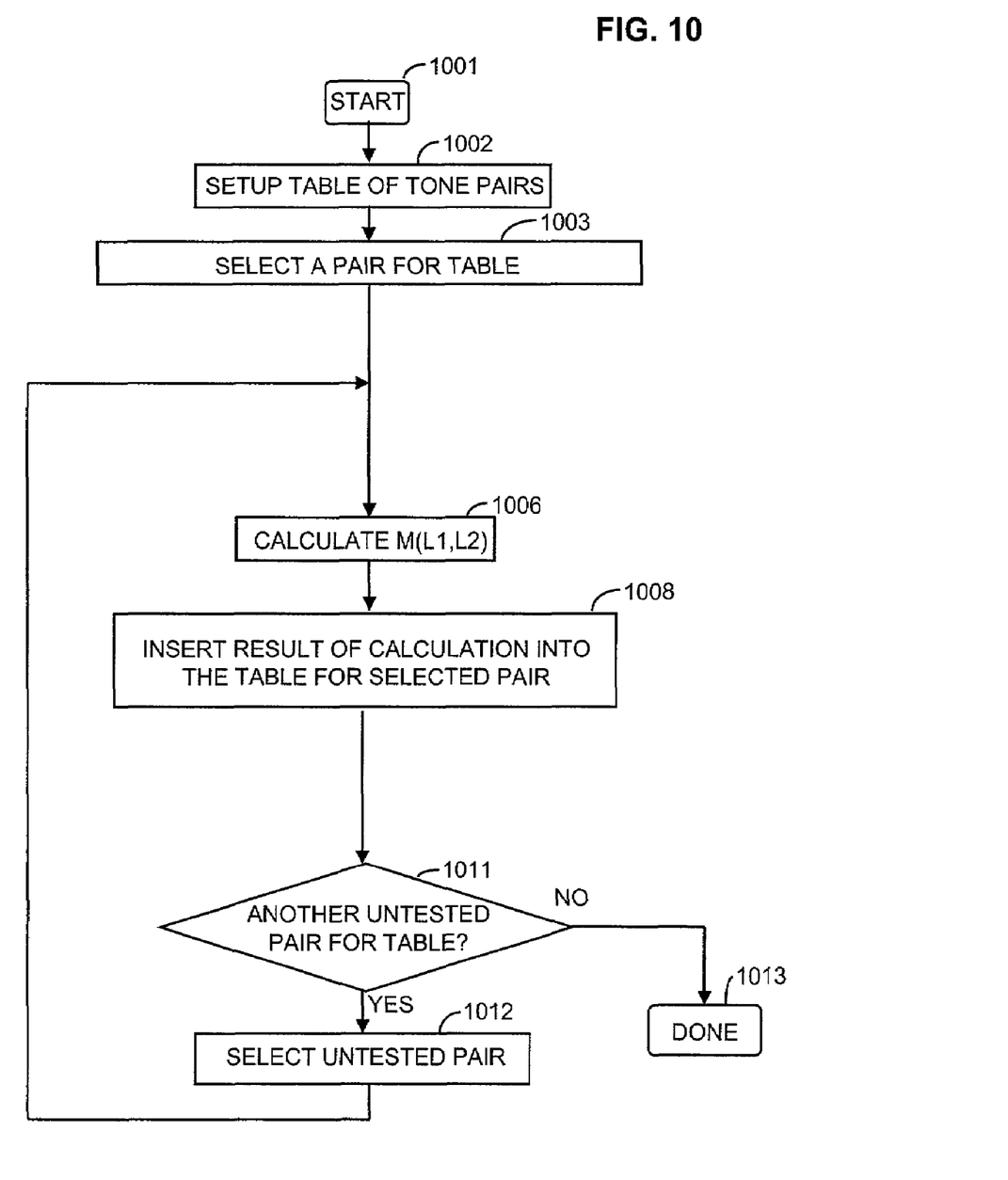
FIG. 10 illustrates, in flow chart form, operations performed by an embodiment of the invention.
Figure 11:
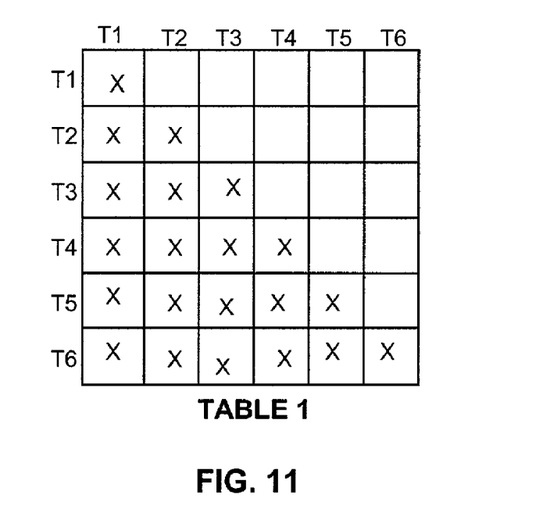
FIG. 11 illustrates a table for use with an embodiment of the inventrion.

Decision block 903 then determines when a transition has occurred in the input signal. After a transition has occurred, decision block 904 determines if this transition was caused by noise. If the answer is yes, block 906 instructs all of the valid engines to ignore the noise and proceed with the matching for the present period. Control is transferred back to decision block 903 from block 906. If the transition was not caused by noise, control is transferred to decision block 907 which determines if any of the engines have determined a match. If the answer is no, control is transferred to block 908 which signals the control that the tone is unknown before transferring control back to decision block 902. If the answer in decision block 907 is yes, block 909 determines the maximum number of periods that must be checked based on the number of matching engines. The maximum number is determined from the matching engines using either of embodiments illustrated in FIGS. 10 and 12. If the embodiment illustrated in FIG. 10 is used, block 909 simply selects the largest number of periods from a table such as illustrated in FIG. 11 for the matching engines. (The X's in Table 1 of FIG. 11 are entries that do not have to be recalculated.) If the embodiment illustrated in FIG. 12 is used, block 909 passes control to block 1201 and receives control back from block 1213. The maximum number of periods is equal to the variable, VALUE, that is calculated in block 1209. Block 909 transfers control to block 910. Decision block 910 determines if enough periods have been analyzed using the maximum number of periods determined by block 909. If the answer in decision block 910 is that the number of analyzed periods is less than the maximum number, block 911 marks the non-matching engines as invalid by informing them to stop the matching process and transfers control back to decision block 903. If the answer in decision block 910 is yes, decision block 912 determines if only one engine is indicating a match. If the answer is no meaning that there are more than one engine indicating a match after sufficient periods have been analyzed, block 913 chooses the engine which has the best goodness fit, and the identification of the associated tone is transmitted to the control by block 914. If the answer in decision block 912 is yes, the unique engine that found a match has its tone designation transmitted to the control by block 914. After transmission of the determined tone designation to the control, block 914 transfers control back to decision block 902. The blocks illustrated in FIG. 9 may be performed in a different order or may be performed in parallel.

FIG. 10 illustrated an embodiment of the invention for use with FIG. 9. Once started in block 1001, block 1002 sets up a table such as Table 1 of FIG. 11. Table 1 is populated with the results of the calculation of block 1006 for each pair of different tones. Table 1 illustrates a maximum of six tones (T1–T6) by way of an example. However, the number of tones is equal to the number of tones that can be detected. Block 1003 then selects a pair of tones for the table. Block 1006 then performs the calculation of Equation 1. This equation performs the calculation to determine $M(l_1,l_2)$. (Note that L1, $L_1$ and $l_1$ are equivalent as are L2, $L_2$ and $l_2$.)

Decision block 1008 then inserts the numerical value of the calculation from Equation 1 into the table. After execution of block 1008, control is transferred to decision block 1011. The latter decision block determines if there is another untested pair for the table. If the answer is no, the operations are complete, and control is transferred to block 1013. If the answer in decision block 1011 is yes, block 1012 selects another pair from the untested pairs and returns control to block 1006.

FIG. 12 illustrated an embodiment of the invention for use with FIG. 9. Once started in block 1201, block 1202 sets VALUE equal to zero. Block 1203 then determines all possible combinations of pairs of tones for the matching engines. Block 1204 then selects a pair from the determined pairs of tones. Block 1206 then performs the calculation of Equation 1. This equation performs the calculation to determine $M(l_1,l_2)$. (Note that L1, $L_1$ and $l_1$ are equivalent as are L2, $L_2$ and $l_2$.)

Decision block 1208 then determines if the numerical value of the calculations performed in Equation 1 are greater than the contents of the variable VALUE. If the answer is yes, block 1209 sets the variable VALUE equal to the results of the calculation. After execution of block 1209 or if the decision in decision block 1208 was no, control is transferred to decision block 1211. The latter decision block determines if there is an untested pair in the determined pairs of block 1203. If the answer is no, the operations are complete, and control is transferred to block 1213. If the answer in decision block 1211 is yes, block 1212 selects another pair from the untested pairs and returns control to block 1206.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for determining a number defining a time to detect a received tone in response to input information defining the received tone, comprising the steps of:
   (a) determining for each of all possible tones all sequences of each of all possible tones;
   (b) calculating the number from the sequences of all of the possible tones by determining all pairs of tone for all possible tones, calculating a value for the number of times for each pair of possible tones, and setting the number of times equal to the largest value of all calculated values;
   (c) comparing all sequences of all possible tones with a portion of the input information;
   (d) determining a subset of sequences that match the input information where all other sequences of all possible tones did not match the input information;
   (e) comparing sequences of the subset with another portion of the input information;
   (f) determining a new subset of sequences that match the input information where all other sequences of the subset did not match the input information; and
   (g) repeating steps (e) and (f) by substituting the new subset for the subset of step (e) until steps (e) and (f) have been repeated the number of times.

2. The method of claim 1 wherein all sequences of the possible tones comprise time intervals of energy and non-energy and the number is calculated from the time intervals of energy and non-energy.

3. The method of claim 1 wherein the step of calculating a value comprises the step of evaluating a function $m(l_1,l_2)$ where $l_1 > l_2$ and $m(l_1,l_2) = l_1$ if $MOD(l_1,l_2) = 0$ otherwise $m(l_1, l_2) = l_1 - MOD(l_1,l_2) + m(l_2, MOD(l_1,l_2))$ and $l_1$ and $l_2$ are the lengths of the sequences of each pair of possible tones.

4. The method of claim 3 wherein all sequences of the possible tones comprise time intervals of energy and non-energy and $l_1$ and $l_2$ are based on the time intervals of energy and non-energy.

5. A method for determining to cease detecting for an unknown tone by a tone detector, comprising the steps of:
   calculating from possible tones a maximum time interval to activate tone detector by determining all pairs of tone for all possible tones, calculating a value for the maximum time for each pair of possible tones, and setting the maximum time equal to the largest value of all calculated values; and
   determining by the tone detector the unknown tone after the maximum time interval.

6. The method of claim 5 wherein the step of calculating comprises the steps of determining for each of all possible tones all sequences of each of all possible tones; and
   calculating the maximum time interval from the sequences of all of the possible tones.

7. The method of claim 5 wherein the step of calculating a value comprises the step of evaluating a function $m(l_1,l_2)$ where $l_1 > l_2$ and $m(l_1,l_2) = l_1$ if $MOD(l_1,l_2) = 0$ otherwise $m(l_1, l_2) = l_1 - MOD(l_1,l_2) + m(l_2, MOD(l_1,l_2))$ and $l_1$ and $l_2$ are the lengths of the sequences of each pair of possible tones.

8. A method for defining a time interval to detect a received tone in response to input information defining the received tone, comprising the steps of:
   (a) determining for each of all possible tones all sequences of each of all possible tones;
   (b) setting initially all sequences as matching sequences;
   (c) comparing matching sequences of possible tones with a portion of the input information;
   (d) determining matching sequences that match the input information;
   (e) determining the time interval from the matching sequences; and
   (f) repeating steps (c) through (e) by substituting the matching sequences determined in step (d) for the matching sequences of step (c) until the time interval has been exceeded.

9. The method of claim 8 wherein the step of determining the time interval comprises the step of accessing a table to obtain the time interval.

10. The method of claim 9 wherein the step of accessing comprises obtaining a value for each pair of matching sequences from the table; and
selecting the largest value to be the time interval.

11. The method of claim 9 further comprises the step of generating the values of the table by determining all pairs of tones for all possible tones of all sequences;
calculating a value for each pair of possible tones; and
inserting the value of each pair into the table.

12. The method of claim 11 wherein the step of calculating a value comprises the step of evaluating a function $m(l_1,l_2)$ where $l_1>l_2$ and $m(l_1,l_2)=l_1$ if $MOD(l_1,l_2)=0$ otherwise $m(l_1,l_2)=l_1-MOD(l_1,l_2)+m(l_2, MOD(l_1,l_2))$ and $l_1$ and $l_2$ are the lengths of the sequences of each pair of possible tones.

13. The method of claim 8 wherein the step of determining the time interval comprises the step of calculating the time interval from the matching sequences of step (d).

14. The method of claim 13 further comprises the step of generating the values by determining all pairs of tones of the matching sequences;
calculating a value for each pair of tones; and
selecting the largest calculated value to be the time interval.

15. The method of claim 14 wherein the step of calculating a value comprises the step of evaluating a function $m(l_1,l_2)$ where $l_1>l_2$ and $m(l_1,l_2)=l_1$ if $MOD(l_1,l_2)=0$ otherwise $m(l_1,l_2)=l_1-MOD(l_1,l_2)+m(l_2, MOD(l_1,l_2))$ and $l_1$ and $l_2$ are the lengths of the sequences of each pair of tones.

16. An apparatus for classifying a received signal representing a received tone, comprising:
a plurality of tone engines with a subset of the plurality of tone engines corresponding to each of the possible tones with each of the subset of the plurality of tone engines capable of detecting a starting point of a unknown tone corresponding to each of the possible tones;
each of the plurality of tone engines comparing with sequential time intervals of the received signal and generating a match or non-match signal; and
a controller responsive to a calculated number based on the plurality of tone engines and matches from ones of the subsets having tone engines generating match signals for the sequence of time intervals of the received signal for identifying the received signal as being one of the possible tones and the controller further determining all pairs of tone engines, calculating a value for the calculated number for each pair of tone engines, and setting the calculated number equal to the largest value of all calculated values.

17. The apparatus of claim 16 wherein each value is calculated by evaluating a function $m(l_1,l_2)$ where $l_1>l_2$ and $m(l_1,l_2)=l_1$ if $MOD(l_1,l_2)=0$ otherwise $m(l_1,l_2)=l_1-MOD(l_1,l_2)+m(l_2, MOD(l_1,l_2))$ and $l_1$ and $l_2$ are the lengths of the sequences of each pair of tone engines.

18. The apparatus of claim 16 wherein the controller calculates the calculated number before detecting each unknown tone.

19. The apparatus of claim 16 wherein the controller calculates the calculated number upon being started.

20. The apparatus of claim 16 wherein in each of the tone engines compares for a pattern of energy and non-energy in the time intervals of the sequential time intervals of the received signal.

21. The apparatus of claim 16 wherein in each of the tone engines compares for frequencies in the sequential time intervals of the received signal.

22. An apparatus for classifying a received signal representing a received tone, comprising:
a plurality of tone engines with a subset of the plurality of tone engines corresponding to each of the possible tones with each of the subset of the plurality of tone engines capable of detecting a starting point of a unknown tone corresponding to each of the possible tones;
each of the plurality of tone engines comparing with sequential time intervals of the received signal and generating a match or non-match signal; and
a controller responsive to an end of a time interval calculated from the tone engines generating the match signals and matches from ones of the subsets having tone engines generating match signals for the sequence of time intervals of the received signal for identifying the received signal as being one of the possible tones and the controller further determining all pairs of matching tone engines, calculating a value for each matching pair of tone engines, and setting the time interval equal to the largest value of all calculated values.

23. The apparatus of claim 22 wherein each value is calculated by evaluating a function $m(l_1,l_2)$ where $l_1>l_2$ and $m(l_1,l_2)=l_1$ if $MOD(l_1,l_2)=0$ otherwise $m(l_1,l_2)=l_1-MOD(l_1,l_2)+m(l_2, MOD(l_1,l_2))$ and $l_1$ and $l_2$ are the lengths of the sequences of each pair of tone engines.

24. The apparatus of claim 22 wherein the controller further accessing a table to obtain the time interval.

25. An apparatus for determining a number defining a time to identity a received tone signal, comprising:
means for comparing time intervals of the received tone signal with patterns of possible tones wherein a pattern is used for each starting point of each non-repetitive time intervals of each of the possible tones;
means for calculating the number from the patterns of possible tones by determining all pairs of patterns of possible tones, calculating a value for the calculated number for each pair of tone engines, and setting the calculated number equal to the largest value of all calculated values;
means for generating a match signal for each of the patterns of the possible tones for which one of the time intervals of the received tone signal; and
means for designating the received tone signal as being one of the possible tones in response to match signals generated by the means for generating upon the means for generating having been active for operations equal to the number.

26. The apparatus of claim 25 wherein each value is calculated by evaluating a function $m(l_1,l_2)$ where $l_1>l_2$ and $m(l_1,l_2)=l_1$ if $MOD(l_1,l_2)=0$ otherwise $m(l_1,l_2)=l_1-MOD(l_1,l_2)+m(l_2, MOD(l_1,l_2))$ and $l_1$ and $l_2$ are the lengths of the sequences of each pair of tone engines.

* * * * *